May 4, 1965 K. KÖNIG 3,181,758

MACHINE FOR CUTTING BRITTLE SYNTHETIC SHEET MATERIAL

Filed April 23, 1962

INVENTOR
Karl König by:
Michael S. Striker
atty

3,181,758
MACHINE FOR CUTTING BRITTLE SYNTHETIC SHEET MATERIAL
Karl König, Seesen, Harz, Germany, assignor to Hans Kolbe and Hans Köhler
Filed Apr. 23, 1962, Ser. No. 189,589
Claims priority, application Germany, Apr. 28, 1961, F 33,795
5 Claims. (Cl. 225—103)

The present invention relates to a machine for cutting sheets of brittle synthetic material, e.g. sheets of hard paper.

The development of new materials, mainly synthetic materials, has given rise to even greater problems in the tool manufacturing industry since these synthetic materials often have quite different properties from the conventional natural materials. This is particularly true for brittle synthetic material such as hard paper, which does not allow itself to be cut clean with conventional pairs of cutting knives.

On the other hand, the need for a clean cut in sheets of brittle synthetic material is becoming even more important and this problem has been solved according to the present invention whereby the cutting edges of two knives are moved towards one another with a relative overlap until fracture of the material occurs.

Preferably the measure of overlap between the knives is less than 0.3 mm.

This cutting method as opposed to the conventional method provides a complete solution of the problem, as shown in many tests. The cutting proper is interrupted during the separating step and continued by a stamping step, which causes the complete separation of the sheet after the initial fracture.

Furthermore, the present invention is also concerned with a shearing machine or shearing tool for carrying out the above-mentioned method. In one embodiment the upper and lower knives are constructed as rotary knives which rotate with the same rotational velocity.

According to another embodiment, one of the knives is formed as a rotary knife and the other as a straight cutting edge and the circular knife is rotatable over the cutting edge.

Moreover the overlap provided between the cutters and/or the distance between the cutting edges may be made adjustable.

In this way, one and the same machine can be adjusted to produce different cutting conditions according to the material to be cut and the thickness thereof.

In order that the invention may be more readily understood, preferred embodiments thereof are described below in conjunction with the accompanying drawing, in which.

Figure 1:
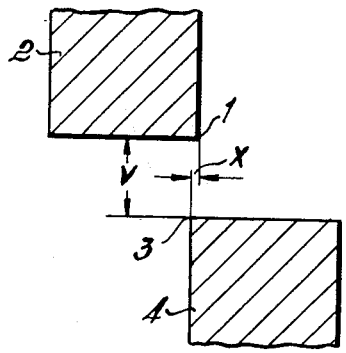
FIG. 1 shows schematically the two cutters of the present invention in their relatively closest portion.
Figure 2:
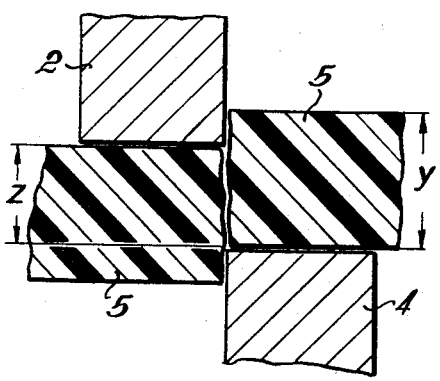
FIG. 2 shows schematically the cutters in the same position as shown in FIG. 1, with the material to be cut in its position at the instant that fracture occurs.

In the method according to the present invention, the cutting edge 1 of the cutter 2 is provided opposite the cutting edge 3 of the cutter 4, in such manner that the cutters 2 and 4 overlap one another by a distance "$x$." This overlap "$x$" represents a negative cutting clearance. Only a limited relative movement of the cutters 2 and 4 is necessary according to the present invention. The cutters need only be moved towards one another until the material 5 fractures. When the fracture occurs, the cutters 2 and 4 can again move towards one another. FIGS. 1 and 2 show the cutters 2 and 4 in the position in which the fracture occurs and FIG. 2 shows the fracture of the material after which the separation is then complete. The material has a thickness "$y$." The distance "$z$" corresponds to the distance between the edges of the material upon fracture. This distance is different for different qualities of material. The distance "$y-z$" of the upper cutter 2 is the depth through which the material 5 is exposed to a cutting effect.

Detrimental pressures and bending stresses are avoided before the separation proper by providing a negative cutting clearance between the cutting edges. Likewise, tearing or splintering is avoided. This cutting method is therefore particularly suitable for brittle synthetic materials which cannot be separated cleanly with a simple cutting operation.

Figure 3:
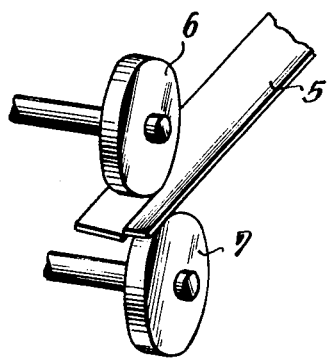
FIG. 3 shows schematically one embodiment of the machine provided according to the invention.

The separation can be effected for example by the machine shown in FIG. 3. It consists of an upper circular knife 6 and a lower circular knife 7. The two knives rotate with the same rotational velocity in opposite directions and a negative cutting clearance "$x$" is maintained therebetween. The device is so constructed that the distance "$x$" and the distance "$v$" can be altered by corresponding adjustment of the circular knives 6 and 7.

Figure 4:
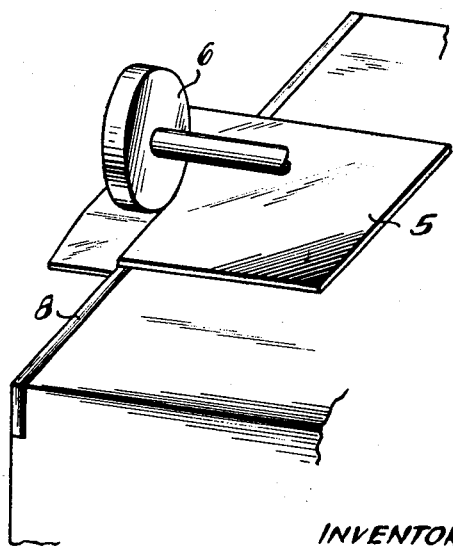
FIG. 4 shows schematically a second embodiment of this machine.

In the embodiment shown in FIG. 4 the circular knife 7 is replaced by a cutting edge 8. Apart from this, the arrangement is the same as in the embodiment shown in FIG. 3. The negative cutting clearance "$x$" and the distance "$v$" can also be varied by corresponding adjustment.

I claim:

1. In a machine for cutting sheets of brittle material along a cutting line, in combination, a pair of rollers adapted to engage opposite face portions of a sheet to be cut, each of said rollers having a cylindrical surface and an end face, said end faces being respectively arranged at opposite sides of the cutting line in such a manner that the cylindrical surfaces of said rollers slightly overlap each other in axial direction in the region of the cutting line; and means for rotatably supporting said rollers at a distance from each other to form a minimum radial gap between said rollers smaller than the thickness of the sheet to be cut, whereby during feeding of a sheet through said radial gap said sheet will be fractured along said cutting line while detrimental bending stresses on said sheet during said fracture will be prevented due to said slight overlap of said roller surfaces.

2. In a machine for cutting sheets of brittle material along a cutting line, in combination, a pair of rollers adapted to engage opposite face portions of a sheet to be cut, each of said rollers having a cylindrical surface and an end face normal to the roller axis, said end faces being respectively arranged at opposite sides of the cutting line in such a manner that the cylindrical surfaces of said rollers slightly overlap each other in axial direction in the region of the cutting line; and means for rotatably supporting said rollers at a distance from each other to form a minimum radial gap between said rollers smaller than the thickness of the sheet to be cut, whereby during feeding of a sheet through said radial gap said sheet will be fractured along said cutting line while detrimental bending stresses on said sheet during said fracture will be prevented due to said slight overlap of said roller surfaces.

3. A machine as set forth in claim 2 in which said axial overlap of the cylindrical roller surfaces is less than 0.3 mm.

4. A machine as set forth in claim 2 and including means for adjusting the minimum radial gap between said rollers.

5. In a machine for cutting sheets of brittle material along a cutting line, in combination, a first cutting element in form of a roller having a cylindrical surface and an end face normal to the roller axis, said roller adapted to engage with the cylindrical surface thereof one face of a sheet to be cut; a second cutting element having a plane surface parallel to the axis of the roller and an end face parallel to said end face of said roller, said second cutting element adapted to engage with said plane surface the opposite face of the sheet, said end faces being respectively arranged at opposite sides of the cutting line in such a manner that the cylindrical surface of said roller slightly overlaps in axial direction said plane surface of said second cutting element; and means for rotatably supporting said roller at a distance from said plane surface of said second cutting element to form a minimum radial gap between the cylindrical surface of said roller and said plane surface of said second cutting element smaller than the thickness of the sheet to be cut, whereby during feeding of a sheet through said radial gap said sheet will be fractured along said cutting line while detrimental bending stresses on said sheet during said fracture will be prevented due to said slight overlap of said cylindrical roller surface and said plane surface of said second cutting element.

References Cited by the Examiner

UNITED STATES PATENTS

| | | | |
|---|---|---|---|
| 193,842 | 8/77 | Atkinson | 225—3 X |
| 1,085,289 | 1/14 | Neubert | 83—504 X |
| 1,716,991 | 6/29 | Turner | 83—51 X |
| 2,254,413 | 9/51 | Battershell | 83—51 X |
| 2,443,764 | 6/48 | Ekberg et al. | 83—623 X |
| 2,648,383 | 8/53 | Hahn | 83—623 |

FOREIGN PATENTS 7,350   12/96   Sweden.

ANDREW R. JUHASZ, *Primary Examiner.*